Figure 1:
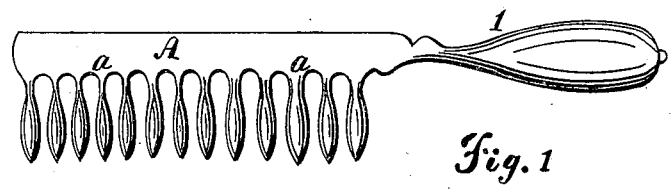
Figure 2:
Figure 2:
Figure 3:
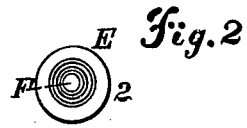
Figure 3:
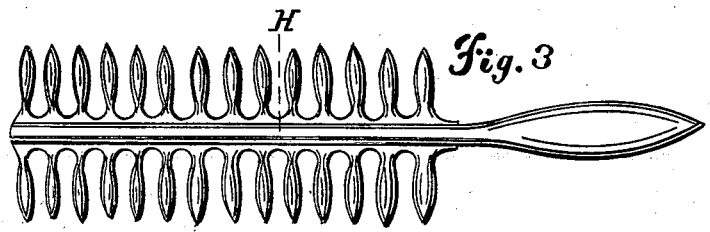

W. PATTON.
Dyeing Hair.

No. 82,982.

Patented Oct. 13, 1868.

UNITED STATES PATENT OFFICE.

WILLIAM PATTON, OF SPRINGFIELD, MASSACHUSETTS.

Letters Patent No. 82,982, dated October 13, 1868.

IMPROVEMENT IN APPARATUS FOR DYEING HAIR.

The Schedule referred to in these Letters Patent and making part of the same.

*To all whom it may concern:*

Be it known that I, WILLIAM PATTON, of Springfield, Hampden county, Commonwealth of Massachusetts, have invented certain new and useful Improvements in Hair-Dyeing Apparatus; and I do hereby declare that the following is a full and clear description thereof, reference being had to the accompanying drawings, and to the letters of reference marked thereon.

In the drawings—

Figure I is a side view, and

Figure II a sectional view of my improved apparatus, each view containing two differently-shaped tools, having the same principle of invention involved; and Figure III is another view of one of these tools, with a different arrangement upon the same principle.

My invention consists in the peculiar application of certain compositions (which I will describe) to the teeth of a comb, or other suitable tool, for bringing the compositions alternately or both together in contact with the hair, beard, or moustache of a person, for the purpose of dyeing the same.

The chemical principles involved are found in the two separate composites, as follows: Nitrate of silver and gallic acid.

The object to be obtained is to gain color by the contact of these two articles, and they should be brought into such contact upon the substance to be colored. In order to do this conveniently it is necessary to put them in such a form that they can be applied to the hair or beard without staining the skin or clothes of the person using the dye. For this purpose I use several different kinds of apparatus, two of which I herein show for illustration, the principle being the same in all cases.

The first of these is a comb, A, with the teeth *a* made far enough apart to admit of several coatings of my preparations being attached to them, in the following manner:

To every pound of nitrate of silver, I add two pounds of gum-arabic, or other material suited to the purpose, as hereinafter stated and proportioned. This is dissolved in about one quart of soft water, and heated to, say, 125° Fahrenheit, which dissolves and forms thin, gelatinous liquid. This I coat upon the teeth of the comb with a soft brush, the gum causing it to adhere closely.

The other chemical composite is prepared as follows:

To one pound of gallic acid, eight pounds of gum-arabic (or other substances, in the proportions as hereinafter stated,) are added, and the whole dissolved in sufficient water to form an adhesive liquid, and strained. This preparation is also applied with a brush, so as to coat the teeth of a comb.

The manner of coating the teeth of the comb is varied, according to the construction of the same. If the comb is formed, as shown in Fig. III, that is, with a row of teeth on each side of the shank, a coating of the preparation of the nitrate of silver is put on the teeth on one side, and the other composition on the other row of teeth.

The comb A, so prepared, is used, with alternate sides, upon the hair or beard. It is, however, more convenient to have a single comb, or one with only one row of teeth, prepared with both compositions; and I arrange them as follows:

I first apply a coating of the preparation of nitrate of silver upon the teeth of the comb. I then apply a coating of the gallic-acid composition over that; then the nitrate of silver again, and so on, until the teeth of the comb are properly covered, winding up with an external coat of the acid. Now, when the comb so prepared is used, the two compositions come in contact with the hair at nearly the same time, the acid coating wearing through or coming off as it comes in contact with the moistened hair.

This I regard as the most important improvement in the use of these utensils, as it requires only a single comb, and only requiring a single operation, prevents all mistakes, and adds greatly to the convenience of use, manufacture, and packing.

It is not necessary, however, to the intent and purpose of my invention, that a comb should be used, as any form of utensil, that can conveniently be applied to bring these two compositions shown into contact with each other and the hair, will carry out its purpose. For this reason, I show, in the drawing, my device for dyeing the moustache, which consists of a small cylindrical handle, E, with a projection, F, upon which the preparations of dyeing-substances are coated alternately in a similar manner, as already shown upon the comb. This device is designed for the moustache and beard, and by it the color can be applied very conveniently and to a nicety.

Different substances may be used as a vehicle in attaching the nitrate of silver or gallic acid to the devices for applying them, without altering the principle involved, such as gum-tragicum, gum-caoutchouc, paste, &c.; and it is only necessary to prepare them with the coloring-ingredients, so as to readily coat the same upon the article to be used, to effect their purpose.

The following proportions are sometimes used for the within ingredients:

Nitrate of silver, one pound; gum-tragicum, two and a half pounds; water, three pounds. Heat to 100°.

Gallic acid, one pound; gum-tragicum, ten pounds. Water to dissolve.

Other proportions are required in the different combinations of the main dyeing-ingredients and their vehicles.

By this means I greatly simplify the dyeing-comb patented by Lucius S. Stimpson, December 24, 1867, obtaining the combined effect of two dyeing-substances without the use of an extra tool, and also obtaining a composition of nitrate of silver which can be easily prepared, and which does not readily come off from the tool for applying it, except under the proper circumstances in which the hair or beard is moistened before use.

Now, having described my improvements,

What I claim as new, and propose securing by Letters Patent, is—

1. In combination with a comb, A, or other suitable device for applying them to the hair, beard, or moustache, simultaneously, for the purpose of coloring either, alternate coats of nitrate of silver and gallic acid, conveyed and attached to such comb, or other device, by means of suitable vehicle, such as gum-arabic, gum-tragicum, or caoutchouc, substantially in the manner herein described.

2. The combination of the nitrate of silver with the gum-arabic, or other suitable gelatinous vehicle for the purpose, prepared and applied substantially in the manner described.

3. The arrangement of the comb A with two rows of opposite teeth, one row prepared with nitrate of silver and the other with gallic acid, in the manner described.

· WM. PATTON.

Witnesses:
   EDWARD H. HYDE,
   J. B. GARDINER.